(12) United States Patent
Garcia-Luna-Aceves

(10) Patent No.: US 10,091,012 B2
(45) Date of Patent: *Oct. 2, 2018

(54) SYSTEM AND METHOD FOR MULTI-SOURCE MULTICASTING IN CONTENT-CENTRIC NETWORKS

(71) Applicant: CISCO TECHNOLOGY, INC., San Jose, CA (US)

(72) Inventor: Jose J. Garcia-Luna-Aceves, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,557

(22) Filed: May 19, 2017

(65) Prior Publication Data

US 2017/0257224 A1 Sep. 7, 2017

Related U.S. Application Data

(63) Continuation of application No. 14/582,516, filed on Dec. 24, 2014, now Pat. No. 9,660,825.

(51) Int. Cl.
*H04L 12/18* (2006.01)
*H04L 12/733* (2013.01)
*H04L 29/08* (2006.01)

(52) U.S. Cl.
CPC ........ *H04L 12/185* (2013.01); *H04L 12/1854* (2013.01); *H04L 45/122* (2013.01); *H04L 67/327* (2013.01)

(58) Field of Classification Search
CPC .................................................. H04L 12/185
See application file for complete search history.

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012.

(Continued)

*Primary Examiner* — Parth Patel

(57) ABSTRACT

One embodiment of the present invention provides a system for updating routing information associated with a multicast group in an information-centric network (ICN). During operation, a first node in the ICN receives an update message for the multicast group from a neighbor node. The multicast group includes a root anchor node and a number of anchor nodes with the root anchor node having a smaller name than the anchor nodes. The update message specifies a prefix associated with the multicast group and the root anchor node of the multicast group. The system selects, based on topology information stored on the first node, from neighbors of the first node one or more next-hop neighbors that meet a notification condition, and forwards the update message to the one or more next-hop neighbors.

20 Claims, 8 Drawing Sheets

(56) References Cited

U.S. PATENT DOCUMENTS

| | | | |
|---|---|---|---|
| 4,921,898 A | 5/1990 | Lenney | |
| 5,070,134 A | 12/1991 | Oyamada | |
| 5,110,856 A | 5/1992 | Oyamada | |
| 5,214,702 A | 5/1993 | Fischer | |
| 5,377,354 A | 12/1994 | Scannell | |
| 5,506,844 A | 4/1996 | Rao | |
| 5,629,370 A | 5/1997 | Freidzon | |
| 5,845,207 A | 12/1998 | Amin | |
| 5,870,605 A | 2/1999 | Bracho | |
| 6,021,464 A | 2/2000 | Yao | |
| 6,047,331 A | 4/2000 | Medard | |
| 6,052,683 A | 4/2000 | Irwin | |
| 6,085,320 A | 7/2000 | Kaliski, Jr. | |
| 6,091,724 A | 7/2000 | Chandra | |
| 6,115,385 A * | 9/2000 | Vig | H04L 29/12009 370/401 |
| 6,128,623 A | 10/2000 | Mattis | |
| 6,128,627 A | 10/2000 | Mattis | |
| 6,173,364 B1 | 1/2001 | Zenchelsky | |
| 6,209,003 B1 | 3/2001 | Mattis | |
| 6,226,618 B1 | 5/2001 | Downs | |
| 6,233,617 B1 | 5/2001 | Rothwein | |
| 6,233,646 B1 | 5/2001 | Hahm | |
| 6,289,358 B1 | 9/2001 | Mattis | |
| 6,292,880 B1 | 9/2001 | Mattis | |
| 6,332,158 B1 | 12/2001 | Risley | |
| 6,363,067 B1 | 3/2002 | Chung | |
| 6,366,988 B1 | 4/2002 | Skiba | |
| 6,574,377 B1 | 6/2003 | Cahill | |
| 6,597,703 B1 * | 7/2003 | Li | H04L 12/18 370/428 |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,732,273 B1 | 5/2004 | Byers | |
| 6,769,066 B1 | 7/2004 | Botros | |
| 6,772,333 B1 | 8/2004 | Brendel | |
| 6,775,258 B1 | 8/2004 | vanValkenburg | |
| 6,834,272 B1 | 12/2004 | Naor | |
| 6,862,280 B1 | 3/2005 | Bertagna | |
| 6,901,452 B1 | 5/2005 | Bertagna | |
| 6,915,307 B1 | 7/2005 | Mattis | |
| 6,917,985 B2 | 7/2005 | Madruga et al. | |
| 6,957,228 B1 | 10/2005 | Graser | |
| 6,968,393 B1 | 11/2005 | Chen | |
| 6,981,029 B1 | 12/2005 | Menditto | |
| 7,007,024 B2 | 2/2006 | Zelenka | |
| 7,013,389 B1 | 3/2006 | Srivastava | |
| 7,031,308 B2 | 4/2006 | Garcia-Luna-Aceves | |
| 7,043,637 B2 | 5/2006 | Bolosky | |
| 7,061,877 B1 | 6/2006 | Gummalla | |
| 7,080,073 B1 | 7/2006 | Jiang | |
| RE39,360 E | 10/2006 | Aziz | |
| 7,149,750 B2 | 12/2006 | Chadwick | |
| 7,152,094 B1 | 12/2006 | Jannu | |
| 7,177,646 B2 | 2/2007 | ONeill | |
| 7,206,860 B2 | 4/2007 | Murakami | |
| 7,206,861 B1 | 4/2007 | Callon | |
| 7,210,326 B2 | 5/2007 | Kawamoto | |
| 7,233,948 B1 | 6/2007 | Shamoon | |
| 7,246,159 B2 | 7/2007 | Aggarwal | |
| 7,257,837 B2 | 8/2007 | Xu | |
| 7,287,275 B2 | 10/2007 | Moskowitz | |
| 7,310,335 B1 * | 12/2007 | Garcia-Luna-Aceves | H04L 12/185 370/390 |
| 7,315,541 B1 | 1/2008 | Housel | |
| 7,339,929 B2 | 3/2008 | Zelig | |
| 7,350,229 B1 | 3/2008 | Lander | |
| 7,362,727 B1 | 4/2008 | ONeill | |
| 7,382,787 B1 | 6/2008 | Barnes | |
| 7,395,507 B2 | 7/2008 | Robarts | |
| 7,430,755 B1 | 9/2008 | Hughes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,535,926 B1 | 5/2009 | Deshpande | |
| 7,542,471 B2 | 6/2009 | Samuels | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,564,786 B2 * | 7/2009 | Lim | H04L 12/185 370/230 |
| 7,564,812 B1 | 7/2009 | Elliott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,636,767 B2 | 12/2009 | Lev-Ran | |
| 7,647,507 B1 | 1/2010 | Feng | |
| 7,660,324 B2 | 2/2010 | Oguchi | |
| 7,685,290 B2 | 3/2010 | Satapati | |
| 7,688,716 B2 * | 3/2010 | Pande | H04L 12/1868 370/222 |
| 7,697,524 B2 * | 4/2010 | Subramanian | H04L 45/16 370/390 |
| 7,698,463 B2 | 4/2010 | Ogier | |
| 7,698,559 B1 | 4/2010 | Chaudhury | |
| 7,769,887 B1 | 8/2010 | Bhattacharyya | |
| 7,779,467 B2 | 8/2010 | Choi | |
| 7,801,069 B2 | 9/2010 | Cheung | |
| 7,801,177 B2 | 9/2010 | Luss | |
| 7,816,441 B2 | 10/2010 | Elizalde | |
| 7,831,733 B2 | 11/2010 | Sultan | |
| 7,835,355 B2 * | 11/2010 | Miyata | H04L 12/5692 370/389 |
| 7,873,619 B1 | 1/2011 | Faibish | |
| 7,908,337 B2 | 3/2011 | Garcia-Luna-Aceves | |
| 7,912,003 B2 * | 3/2011 | Radunovic | H04L 45/123 370/235 |
| 7,924,837 B1 | 4/2011 | Shabtay | |
| 7,953,014 B2 | 5/2011 | Toda | |
| 7,953,027 B2 * | 5/2011 | Previdi | H04L 12/1868 370/256 |
| 7,953,885 B1 | 5/2011 | Devireddy | |
| 7,979,912 B1 | 7/2011 | Roka | |
| 7,983,239 B1 * | 7/2011 | Weinstein | H04L 45/02 370/238 |
| 8,000,267 B2 | 8/2011 | Solis | |
| 8,000,339 B2 * | 8/2011 | Ananthakrishnan | H04L 12/1836 370/432 |
| 8,010,691 B2 | 8/2011 | Kollmansberger | |
| 8,018,964 B2 * | 9/2011 | Eckert | H04L 12/18 370/312 |
| 8,069,023 B1 | 11/2011 | Frailong | |
| 8,074,289 B1 | 12/2011 | Carpentier | |
| 8,117,441 B2 | 2/2012 | Kurien | |
| 8,160,069 B2 | 4/2012 | Jacobson et al. | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,239,331 B2 | 8/2012 | Shanmugavelayutham | |
| 8,271,578 B2 | 9/2012 | Sheffi | |
| 8,271,687 B2 | 9/2012 | Turner | |
| 8,312,064 B1 | 11/2012 | Gauvin | |
| 8,332,357 B1 | 12/2012 | Chung | |
| 8,375,420 B2 | 2/2013 | Farrell | |
| 8,386,622 B2 | 2/2013 | Jacobson | |
| 8,447,851 B1 | 5/2013 | Anderson | |
| 8,462,781 B2 | 6/2013 | McGhee | |
| 8,467,297 B2 | 6/2013 | Liu | |
| 8,473,633 B2 | 6/2013 | Eardley | |
| 8,509,056 B1 * | 8/2013 | Arya | H04L 45/02 370/216 |
| 8,553,562 B2 | 10/2013 | Allan | |
| 8,572,214 B2 | 10/2013 | Garcia-Luna-Aceves | |

(56) References Cited

U.S. PATENT DOCUMENTS

| | | | |
|---|---|---|---|
| 8,577,998 B2* | 11/2013 | Ver Steeg | H04L 29/12933 370/254 |
| 8,654,649 B2 | 2/2014 | Vasseur | |
| 8,665,757 B2 | 3/2014 | Kling | |
| 8,667,172 B2 | 3/2014 | Ravindran | |
| 8,677,451 B1 | 3/2014 | Bhimaraju | |
| 8,688,619 B1 | 4/2014 | Ezick | |
| 8,699,350 B1 | 4/2014 | Kumar | |
| 8,718,055 B2 | 5/2014 | Vasseur | |
| 8,750,820 B2 | 6/2014 | Allan | |
| 8,755,319 B2* | 6/2014 | Katukam | H04L 45/025 370/312 |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,780,706 B1* | 7/2014 | Donner | H04L 45/16 370/229 |
| 8,817,594 B2 | 8/2014 | Gero | |
| 8,817,683 B2 | 8/2014 | Kubo et al. | |
| 8,826,381 B2 | 9/2014 | Kim | |
| 8,832,302 B1 | 9/2014 | Bradford | |
| 8,836,536 B2 | 9/2014 | Marwah | |
| 8,861,356 B2 | 10/2014 | Kozat | |
| 8,862,774 B2 | 10/2014 | Vasseur | |
| 8,868,779 B2 | 10/2014 | ONeill | |
| 8,874,842 B1 | 10/2014 | Kimmel | |
| 8,880,682 B2 | 11/2014 | Bishop | |
| 8,903,756 B2 | 12/2014 | Zhao | |
| 8,923,293 B2 | 12/2014 | Jacobson | |
| 8,934,496 B2 | 1/2015 | Vasseur | |
| 8,937,865 B1 | 1/2015 | Kumar | |
| 8,972,969 B2 | 3/2015 | Gaither | |
| 8,977,596 B2 | 3/2015 | Montulli | |
| 9,002,921 B2 | 4/2015 | Westphal | |
| 9,008,088 B2* | 4/2015 | Ashwood-Smith | H04L 12/462 370/390 |
| 9,032,095 B1 | 5/2015 | Traina | |
| 9,071,498 B2 | 6/2015 | Beser | |
| 9,112,895 B1 | 8/2015 | Lin | |
| 9,137,152 B2 | 9/2015 | Xie | |
| 9,253,087 B2 | 2/2016 | Zhang | |
| 9,270,598 B1 | 2/2016 | Oran | |
| 9,280,610 B2 | 3/2016 | Gruber | |
| 9,426,035 B2* | 8/2016 | Shetty | H04L 41/0893 |
| 9,467,365 B2* | 10/2016 | Jain | H04L 45/122 |
| 9,654,385 B2* | 5/2017 | Chu | H04L 45/245 |
| 9,660,825 B2* | 5/2017 | Garcia-Luna-Aceves | H04L 12/185 |
| 9,736,054 B2* | 8/2017 | Bacthu | H04L 45/04 |
| 2001/0034793 A1* | 10/2001 | Madruga | H04L 12/1854 709/238 |
| 2002/0002680 A1 | 1/2002 | Carbajal | |
| 2002/0010795 A1 | 1/2002 | Brown | |
| 2002/0038296 A1 | 3/2002 | Margolus | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0152305 A1 | 10/2002 | Jackson | |
| 2002/0176404 A1 | 11/2002 | Girard | |
| 2002/0188605 A1 | 12/2002 | Adya | |
| 2002/0199014 A1 | 12/2002 | Yang | |
| 2003/0004621 A1 | 1/2003 | Bousquet | |
| 2003/0009365 A1 | 1/2003 | Tynan | |
| 2003/0033394 A1 | 2/2003 | Stine | |
| 2003/0046396 A1 | 3/2003 | Richter | |
| 2003/0046421 A1 | 3/2003 | Horvitz et al. | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0061384 A1 | 3/2003 | Nakatani | |
| 2003/0074472 A1 | 4/2003 | Lucco | |
| 2003/0088696 A1 | 5/2003 | McCanne | |
| 2003/0097447 A1 | 5/2003 | Johnston | |
| 2003/0099237 A1 | 5/2003 | Mitra | |
| 2003/0140257 A1 | 7/2003 | Peterka | |
| 2003/0229892 A1 | 12/2003 | Sardera | |
| 2004/0024879 A1 | 2/2004 | Dingman | |
| 2004/0030602 A1 | 2/2004 | Rosenquist | |
| 2004/0064737 A1 | 4/2004 | Milliken | |
| 2004/0071140 A1 | 4/2004 | Jason | |
| 2004/0073617 A1 | 4/2004 | Milliken | |
| 2004/0073715 A1 | 4/2004 | Folkes | |
| 2004/0139230 A1 | 7/2004 | Kim | |
| 2004/0196783 A1 | 10/2004 | Shinomiya | |
| 2004/0218548 A1 | 11/2004 | Kennedy | |
| 2004/0221047 A1 | 11/2004 | Grover | |
| 2004/0225627 A1 | 11/2004 | Botros | |
| 2004/0233916 A1 | 11/2004 | Takeuchi | |
| 2004/0246902 A1 | 12/2004 | Weinstein | |
| 2004/0252683 A1 | 12/2004 | Kennedy | |
| 2004/0264503 A1* | 12/2004 | Draves, Jr. | H04L 29/00 370/469 |
| 2004/0267902 A1 | 12/2004 | Yang | |
| 2005/0003832 A1 | 1/2005 | Osafune | |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0066121 A1 | 3/2005 | Keeler | |
| 2005/0073958 A1* | 4/2005 | Atlas | H04L 45/00 370/238 |
| 2005/0074001 A1 | 4/2005 | Mattes | |
| 2005/0129017 A1* | 6/2005 | Guingo | H04L 12/14 370/390 |
| 2005/0132207 A1 | 6/2005 | Mourad | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |
| 2005/0259637 A1 | 11/2005 | Chu | |
| 2005/0262217 A1 | 11/2005 | Nonaka | |
| 2005/0281288 A1 | 12/2005 | Banerjee | |
| 2005/0286535 A1 | 12/2005 | Shrum | |
| 2005/0289222 A1 | 12/2005 | Sahim | |
| 2006/0010249 A1 | 1/2006 | Sabesan | |
| 2006/0018253 A1* | 1/2006 | Windisch | H04L 45/00 370/216 |
| 2006/0029102 A1 | 2/2006 | Abe | |
| 2006/0039379 A1 | 2/2006 | Abe | |
| 2006/0051055 A1 | 3/2006 | Ohkawa | |
| 2006/0072523 A1 | 4/2006 | Richardson | |
| 2006/0077909 A1* | 4/2006 | Saleh | H04L 12/66 370/254 |
| 2006/0099973 A1 | 5/2006 | Nair | |
| 2006/0129514 A1 | 6/2006 | Watanabe | |
| 2006/0133343 A1 | 6/2006 | Huang | |
| 2006/0146686 A1 | 7/2006 | Kim | |
| 2006/0173831 A1 | 8/2006 | Basso | |
| 2006/0193295 A1 | 8/2006 | White | |
| 2006/0203804 A1 | 9/2006 | Whitmore | |
| 2006/0206445 A1 | 9/2006 | Andreoli | |
| 2006/0215684 A1 | 9/2006 | Capone | |
| 2006/0223504 A1 | 10/2006 | Ishak | |
| 2006/0242155 A1 | 10/2006 | Moore | |
| 2006/0256724 A1* | 11/2006 | Martini | H04L 45/04 370/238 |
| 2006/0256767 A1 | 11/2006 | Suzuki | |
| 2006/0268792 A1 | 11/2006 | Belcea | |
| 2006/0288237 A1 | 12/2006 | Goodwill | |
| 2007/0019619 A1 | 1/2007 | Foster | |
| 2007/0073888 A1 | 3/2007 | Madhok | |
| 2007/0094265 A1 | 4/2007 | Korkus | |
| 2007/0112880 A1 | 5/2007 | Yang | |
| 2007/0116014 A1* | 5/2007 | Shuen | H04L 12/2856 370/395.53 |
| 2007/0124412 A1 | 5/2007 | Narayanaswami | |
| 2007/0127399 A1 | 6/2007 | Ookuma et al. | |
| 2007/0127457 A1 | 6/2007 | Mirtorabi | |
| 2007/0156998 A1 | 7/2007 | Gorobets | |

(56) References Cited

U.S. PATENT DOCUMENTS

| | | |
|---|---|---|
| 2007/0160062 A1 | 7/2007 | Morishita |
| 2007/0162394 A1 | 7/2007 | Zager |
| 2007/0165657 A1* | 7/2007 | Smith .................... H04L 12/18 370/401 |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake et al. |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0077710 A1* | 3/2008 | Kouvelas ............ H04L 12/1854 709/250 |
| 2008/0080440 A1 | 4/2008 | Yarvis |
| 2008/0082662 A1 | 4/2008 | Dandliker et al. |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0081952 A1 | 3/2009 | Lee et al. |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0201844 A1* | 8/2009 | Bhatti .................. H04L 12/185 370/312 |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0238163 A1 | 11/2009 | Jacobson |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0014528 A1* | 1/2010 | Amir .................. H04L 45/04 370/400 |
| 2010/0046546 A1 | 1/2010 | Basco |
| 2010/0027539 A1 | 2/2010 | Beverly |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0118755 A1* | 5/2010 | Lin .................. H04W 8/186 370/312 |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |

(56) References Cited

U.S. PATENT DOCUMENTS

| | | |
|---|---|---|
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz et al. |
| 2012/0047361 A1 | 2/2012 | Erdmann |
| 2012/0066727 A1 | 3/2012 | Nozoe |
| 2012/0079056 A1 | 3/2012 | Turányi |
| 2012/0102136 A1 | 4/2012 | Srebrny |
| 2012/0106339 A1 | 5/2012 | Mishra |
| 2012/0110159 A1 | 5/2012 | Richardson et al. |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0028141 A1* | 1/2013 | Bhamare ............ H04L 12/4658 370/255 |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0128786 A1 | 5/2013 | Sultan |
| 2013/0132719 A1 | 5/2013 | Kobayashi |
| 2013/0139245 A1 | 5/2013 | Thomas |
| 2013/0163426 A1 | 5/2013 | Lee |
| 2013/0151584 A1 | 6/2013 | Westphal |
| 2013/0151646 A1 | 6/2013 | Chidambaram |
| 2013/0152070 A1 | 6/2013 | Bhullar |
| 2013/0159550 A1* | 6/2013 | Vasseur ............... H04W 40/248 709/242 |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie et al. |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0016457 A1* | 1/2014 | Enyedi .................. H04L 45/16 370/225 |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |

(56) References Cited

U.S. PATENT DOCUMENTS

| | | |
|---|---|---|
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0269415 A1* | 9/2014 | Banavalikar .......... H04L 12/185 370/254 |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207864 A1 | 7/2015 | Wilson |
| 2015/0222545 A1* | 8/2015 | Sarkar ................ H04L 45/122 370/238 |
| 2015/0271056 A1* | 9/2015 | Chunduri ............ H04L 45/02 370/238 |
| 2015/0279348 A1 | 10/2015 | Cao |
| 2015/0288595 A1* | 10/2015 | Suzuki ................ H04L 45/42 370/254 |
| 2015/0288755 A1 | 10/2015 | Mosko |
| 2015/0312300 A1 | 10/2015 | Mosko |
| 2015/0349961 A1 | 12/2015 | Mosko |
| 2015/0350906 A1* | 12/2015 | Patil .................... H04W 12/06 713/168 |
| 2015/0372903 A1 | 12/2015 | Hui |
| 2015/0381546 A1 | 12/2015 | Mahadevan |
| 2016/0019021 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |
| 2016/0191257 A1* | 6/2016 | Garcia-Luna-Aceves ................ H04L 12/185 370/390 |

FOREIGN PATENT DOCUMENTS

| | | | | |
|---|---|---|---|---|
| DE | 19620817 A1 | 11/1997 | | |
| EP | 0295727 A2 | 12/1988 | | |
| EP | 0757065 A2 | 7/1996 | | |
| EP | 1077422 A2 | 2/2001 | | |
| EP | 1383265 A1 | 1/2004 | | |
| EP | 1384729 A1 | 1/2004 | | |
| EP | 1473889 A2 | 11/2004 | | |
| EP | 2120402 | 11/2009 | | |
| EP | 2120419 | 11/2009 | | |
| EP | 2120419 A2 | 11/2009 | | |
| EP | 2124415 A2 | 11/2009 | | |
| EP | 2214357 A1 | 8/2010 | | |
| EP | 2299754 A1 | 3/2011 | | |
| EP | 2323346 | 5/2011 | | |
| EP | 2482589 A2 * | 8/2012 | ............ | H04L 12/18 |
| EP | 2552083 | 1/2013 | | |
| EP | 2214356 | 5/2016 | | |
| WO | 03005288 A2 | 1/2003 | | |
| WO | 03042254 A1 | 5/2003 | | |
| WO | 03049369 A2 | 6/2003 | | |
| WO | 03091297 A1 | 11/2003 | | |
| WO | 2005041527 | 5/2005 | | |
| WO | 2007113180 A1 | 10/2007 | | |
| WO | 2007122620 | 11/2007 | | |
| WO | WO 2007122620 A2 * | 11/2007 | ............ | H04L 12/18 |
| WO | 2007144388 A1 | 12/2007 | | |
| WO | 2011049890 A1 | 4/2011 | | |
| WO | 2012077073 A1 | 6/2012 | | |
| WO | 2013123410 | 8/2013 | | |
| WO | 2014023072 | 2/2014 | | |
| WO | 2015084327 | 6/2015 | | |

OTHER PUBLICATIONS

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Gamepudi Parimale et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jul. 8, 2016] http://www.ccnx.org/pubs/hhg/1.1%20CCNx%20Protocol%20Introduction.pdf *paragraphs [01.3], [002], [02.1], [0003].

Akash Baid et al: "Comparing alternative approaches for networking of named objects in the future Internet", Computer Communication Workshops (Infocom Wkshps), 2012 IEEE Conference on, IEEE, Mar. 25, 2012, pp. 296-303, *Paragraph [002]* *figure 1*.

Priya Mahadeyan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016]*paragraph [003]-[006], [0011] [0013]* *figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016]*the whole document*.

Cesar Ghali et al. "Elements of Trust in Named-Data Networking", Feb. 13, 2014 Retrieved from the Internet Jun. 17, 2016 http://andv.org/pdf/1402.3332v5.pdf *p. 5, col. 1* *p. 2, col. 1-2* * Section 4.1; p. 4, col. 2* *Section 4.2: p. 4, col. 2*.

Priya Mahadevan et al. "CCN-KRS", Proceedings of the 1st International Conference on Information-Centric Networkings, Inc. '14, Sep. 24, 2014.

(56) References Cited

OTHER PUBLICATIONS

Flavio Roberto Santos et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapesl, Sep. 1, 1997, pp. 499-506.
Sun et al.: "Content-Based Route Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 11, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictonary, Fifth Edition, 2002, Microsoft Press, p. 23.
Mind—A Brief Introduction, John R. Searle, 2004, Oxford University Press, pp. 62-67.
Xie et al. "Collaborative Fowarding and Caching in Content Centric Networks", Networking 2012.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Fall, K. et al., "DTN: an architectural retrospective", Selected area in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-46.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archieve.org/web/20090831170721/http://en.wikipedia.org/wiki/Digital_signature.
"Introducing JSON," http://www.json.org/, downloaded Mar. 11, 2015.
"Microsoft PlayReady." http://www.microsoft.com/playready/. downloaded Mar. 11, 2015.
"Pursuing a pub/sub internet (PURSUIT)," http://www.fp7-pursuit.ew/PursuitWeb/, downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Alekandar Kuzmanovic, and Fabian E. Bustamante. Drafting Behind Akamal: Inferring Network Conditions Based on CDN Redirections. IEEE/ACM Transactions on Networking (Feb. 2009).
B. Lynn$2E.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostices for packaged air conditioner and heat pumps. Pacific Northwest National Laboratory, 2009.
C. Gentry and A. Silverberg, Hierarchical ID-Based Cryptography. Advances in Cryptology—ASIACRYPT 2002, Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Cho, Jin-Hee, Ananthram Swami, and Ray Chen. "A survey on trust management for mobile ad hoc networks." Communications Surveys & Tutorials, IEEE 13.4 (2011):562-583.
Compagno, Alberto, et al, "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
D. Boneh, C. Gentry, and B. Waters, 'Collusi.
D. Boneh and M. Franklin. Identity-Based Encryption from the Weil Pairing. Advances in Cryptology—Crypto 2001, vol. 2139, Springer Berlin Heidelberg (2001).
D.K. Smetters, P. Golle, and J.D. Thornton, "CCNx access control specifications," PARC, Tech. Rep., Jul. 2010.
Dablmnoghaddom, Ali, Maziar Mizazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transpot layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letters, vol. 16, No. 5, 1983.
Fayazbakhsh, S. K., Lin, Y., Tootoonchian, A., Ghodsi, A., Koponen, T., Maggs, B., & Shnker, S. (Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

(56) References Cited

OTHER PUBLICATIONS

G. Wang, Q. Liu, and J. Wu, "Hierarchial attribute-based encryption for fine-grained access control in cloud storage services," in Proc. ACM CCS 2010, Chicago, IL, USA, Oct. 2010, pp. 735-737.
Garcia, Humberto E., Wen-Chiao Lin, and Semyon M. Meerkov. "A resilient condition assessment monitoring system." Resilient Control Systems (ISRCS), 2012 5th International Symposium on. IEEE. 2012.
Garcia-Luna-Aceves, Jose J. 'A unified approach to loop-free routing using distance vectors or link states.' ACM SIGCOMM Computer Communication Review. vol. 19. No. 4. ACM, 1989.
Ghali, Cesar, GeneTsudik, and Ersin Uzun. "Needle in a Haystack: Mitigating Content Poisoning In Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodgrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communication of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transler Networks", Apr. 13, 2010, pp. 1-3, retrieved for the Internet: URL:http://www.cs.unl-paderborn.de/IIIeadmin/informationlk/ag-karl/publications/miscellaneous/optimizing.pdf (retrieved on Mar. 9, 2012).
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer ScienceVolume 5443 (2009).
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Reaearch 11.2 (2005): 169-187.
L. Zhou, V. Varadharajan, and M. Hitchens, "Achieving secure role-based access control on enrypted data in cloud storage," IEEE Trans. Inf. Forensics Security, vol. 8, No. 12, pp. 1947-1950, Dec. 2013.
Li, Wenjia, Anupam, Joshi, and Tim Finin, "Coping with node misbehaviors in ad hoc networks: A multi-dimensional trust management approach." Mobile Data Management (MDM), 2010 Eleventh International Conference on IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy crytography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal Information exchange syntax v. 1.1," IETF RFC 7292, K. Moriarty, Ed., Jul. 2014.
M. Walfish, H. Balakrishnan and S. Shenker, "Untangling the web from DNS," in Proc. USENIX NSDI 2004, Oct. 2010, pp. 735-737.
Mahadevan, Priya, et al. "Orbis: reaching degree correlations to generate annotated internet topologies." ACM SIGCOMM Computer Communication Review. vol. 37, No. 4. ACM, 2007.
Mahadevan, Priya, et al. "Systematic topology analysis and generation using degree correlations." ACM SIGCOMM Computer Communication Review. vol. 36, No. 4, ACM, 2006.
Matocha, Jeff, and Tracy Camp. 'A taxonomy of distributed termination detection algorithms.' Journal of System and Software 43.3 (1988): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Narasimhan, Sriram, and Lee Brownston. "HyDE—A General Framework for Stochastic and Hybrid Modelbased Diagnosis." Proc. DX 7 (2007): 162-169.
Omar, Mawloud, Yacine Challal, and Abdelmadjid Bouabdallah. "Certification-based trust models in mobile ad hoc networks: A survey and taxonomy." Journal of Network and Computer Application 35.1 (2012): 268-286.
P. Mahadevan, E.Uzun, S. Sevilla, and J. Garcia-Luna-Aceves, "CCN-krs: A key resolution service for ocn," In Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng, Efficient Unidirectional Proxy Re-Encryption. Progress in Cryptology—AFRICACRYPT 2010. Springer Berlin Heidelberg (2010).
S. Jahid, P. Mittal, and N. Borisov, "EASiER: Encryption-based access control in social network with efficient revocation," in Proc. ACM ASIACCS 2011, Hong Kong, China Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Determinisitc and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, Chinam Aug. 2013, pp. 73-78.

(56) References Cited

OTHER PUBLICATIONS

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
Sandvine, Global Internet Pheonomena Report—Spring 2012, Located online at http://www.sandivine.com/downloads/ documents/ Phenomenal H 2012/Sandivine Global Internet Phenomena Report 1H 2012.pdf.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007):309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Sun, Ying, and Daniel S. Weld. "A framework for model-based repair." AAAI. 1993.
T. Dierts, "The transport layer security (TLS) protocol version 1.2," IETF RFC 5246, 2008.
The Despotify Project (2012). Available online at http://despotify.sourceforge.net/.
V. Goyal, 0. Pandey, A. Sahai, and B. Waters, "Attribute-based encryption for fine-grained access control of encrypted data," In Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhlkari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatlia. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel. Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 (2014): 66-73.
Seh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paole et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encrytion. Proceedings of the IEEE 92.6 (2004).
Kaya et al., "A Low Power Lookup Technique for Multi-Hashing Network Applications", 2006 IEEE Computer Sociey Annual Symposium on Emergin VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999, pp. 64-79.
Kulkarni A.B. et al., "Implementation of a protoype active network", IEEE, Open Architectures and Network Programming, Apr. 3, 1998, pp. 130-142.
B. Ahlgren et al., "A Survey of Information-centric Netoworking" IEEE Commun. Magazine, Jul. 2012, pp. 26-36.
T. Ballardie, P. Francis, and J. Crowcroft, "Core Based Trees (CBT)," Proc. ACM SIGCOMM '88, Aug. 1988.
M.F. Bari et al., "A Survey of Naming and Routing in Information-Centric Networks," IEEE Commun. Magazine, Jul. 2012, pp. 44-53.
A. Carzaniga et al., "A Routing Scheme for Content-Based Networking," Proc. IEEE Infocom '04, Mar. 2014.
Content Centric Networking Project (CCN) [online]. http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans. on Networking, vol. 4, No. 2, Apr. 1996.

(56) References Cited

OTHER PUBLICATIONS

A. Detti et al., "CONET: A Content-Centric Internetworking Architecture," Proc. ACM ICN '12, 2012.
J.J. Garcia-Luna-Aceves, "Name-Based Content Routing in Information Centric Networks Using Distance Information," Proc. ACM ICN 2014. Sep. 2014.
C. Intanagonwiwat, R. Govindan, and D. Estrin, "Directed Diffusion: A Scalable and Robust Communication Paradigm for Sensor Networks," Proc. ACM MobiCom '00, 2000.
V. Jacobson et al., "Networking Named Content," Proc. IEEE CoNEXT '09, Dec. 2009.
T. Koponen et al., "A Data Oriented (and Beyond) Network Architecture," Proc. ACM SIGCOMM 07, 2007.
S.J. Lee, M. Gerla, and C. Chiang, "On-demand Multicast Routing Protocol in Multihop Wireless Mobile Networks," Mobile Networks and Applications, vol. 7, No. 6, 2002.
G. Xylomenos et al., "A Survey of Information-centric Networking Research," IEEE Communication Surveys and Tutorials, Jul. 2013.
A.K.M. Mahmudul-Hoque et al., "NLSR: Named-Data Link State Routing Protocol," Proc. ACM ICN '13, 2013.
Mobility First Project [online], hltp://mobilityfirst.winlab.rutgers.edu/, Downloaded Mar. 9, 2015.
NDN Project [online]. http://www.named-data.net/, Downloaded Mar. 9, 2015.
M. Parsa and J.J. Garcia-Luna-Aceves, "A Protocol for Scalable Loop-free Multicast Routing." IEEE JSAC, Apr. 1997.
Scalable and Adaptive Internet Solutions (SAIL) Project [online]. http://sail-project.eu/ Downloaded Mar. 9, 2015.
I Solis and J.J. Garcia-Luna-Aceves, "Robust Content Dissemination in Disrupted Environments," Proc. ACM CHANTS 08, Sep. 2008.
L. Wang et al., "OSPFN: An OSPF Based Routing Protocol for Named Data Networking." Technical Report NON-0003, 2012.
C. Yi et al., "Adaptive Forwarding in Named Data Networking," ACM CCR, vol. 42, No. 3, Jul. 2012.

\* cited by examiner

NEIGHBOR TABLE 200

| NEIGHBOR NAME | PREFIX | NEAREST ANCHOR | ROOT ANCHOR |
|---|---|---|---|
| ... | | | |
| $k$ | $j$ | $\{a_{jk}^i, d_{jk}^i, sn_{jk}^i\}$ | $\{ra_{jk}^i, rd_{jk}^i, rsn_{jk}^i\}$ |
| | ... | ... | ... |

ROUTING TABLE 300

| PREFIX | ROUTING UPDATE | VALID NEXT-HOP NEIGHBORS | SHORTEST-PATH NEIGHBOR | ANCHOR LIST |
|---|---|---|---|---|
| ... | ... | ... | ... | ... |
| $(j)$ | $RU|_j^i = \{d_j^i, a_j^i, sn_j^i\}$ | $S_j^i = \{a, b, d, ...\}$ | $s_j^i$ | $A_j^i \supset \{..., m, sn(m), ...\}$ |
| ... | ... | ... | ... | ... |

MULTIPOINT ROUTING TABLE 400

| PREFIX | MULTIPOINT | NEIGHBORS JOINED MIDST |
|--------|------------|------------------------|
| ... | ... | ... |
| (j) | $MUI_j^i = \{ra_j^i, rd_j^i, rsn_j^i\}$ | $MIDST_j^i = \{a, b, d, ...\}$ |
| ... | ... | ... |

SYSTEM AND METHOD FOR MULTI-SOURCE MULTICASTING IN CONTENT-CENTRIC NETWORKS

PRIORITY DATA

This is a continuation patent application of (and claims the benefit of priority under 35 U.S.C. § 120) of U.S. application Ser. No. 14/582,516, filed Dec. 24, 2014, entitled "SYSTEM AND METHOD FOR MULTI-SOURCE MULTICASTING IN CONTENT-CENTRIC NETWORKS," by inventor Jose J. Garcia-Luna-Aceves. The disclosure of the prior application is considered part of and is incorporated by reference in the disclosure of this application in its entirety.

BACKGROUND

Field

The present disclosure relates generally to a content-centric network (CCN). More specifically, the present disclosure relates to a system and method for supporting multicast groups with multiple sources in content-centric networks (CCNs).

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-Centric Networking (CCN), an exemplary ICN architecture brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the ICN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

At the core of all ICN architectures are name resolution and routing of content, and several approaches have been proposed. In some ICN architectures, the names of data objects are mapped into addresses by means of directory servers, and then address-based routing is used for content delivery. By contrast, a number of ICN architectures use name-based routing of content, which integrates name resolution and content routing. With name-based routing, some of the routers (producers or caching sites) advertise the existence of local copies of named data objects (NDO) or name prefixes denoting a set of objects with names sharing a common prefix, and routes to them are established; the consumers of content issue content requests that are forwarded along the routes to the routers that issued the NDO or name prefix advertisements.

Among the various ICN architectures, CCN uses distributed routing protocols to establish routes over which content requests are forwarded. In CCN, a content request (called an "Interest") may be sent over one or multiple paths to a name prefix. It has been argued that Interest-based ICN architectures, such as CCN, provide "native support" for multicasting. However, this is the case only for single-source multicasting if the names in Interests denote the source of a multicast group.

SUMMARY

One embodiment of the present invention provides a system for updating routing information associated with a multicast group in an information-centric network (ICN). During operation, a first node in the ICN receives an update message for the multicast group from a neighbor node. The multicast group includes a root anchor node and a number of anchor nodes with the root anchor node having a smaller name than the anchor nodes. The update message specifies a prefix associated with the multicast group and the root anchor node of the multicast group. The system selects, based on topology information stored on the first node, from neighbors of the first node one or more next-hop neighbors that meet a notification condition, and forwards the update message to the one or more next-hop neighbors.

In a variation on this embodiment, a next-hop neighbor that meets the notification condition is an anchor node of the multicast group, and all neighbors of the anchor node report the anchor node as a preferred anchor node.

In a variation on this embodiment, a next-hop neighbor that meets the notification condition provides a shortest path to at least one of the anchor nodes.

In a variation on this embodiment, a second node intended to join the multicast group generates a join request. The system selects a neighbor of the second node as a next-hop node to the root anchor of the multicast group based on an ordering condition. The next-hop node of the second node to the root anchor node provides a shortest path to the root anchor node. The system forwards the join request to the selected neighbor of the second node.

In a further variation, the system receives a response to the join request sent from the root anchor node or an anchor node of the multicast group. The response traverses a reverse path of the join request to the second node.

In a further variation, the system establishes a multipoint spanning tree that includes the root anchor node, the anchor nodes, and one or more routers that receive the join request.

In a variation on this embodiment, the root anchor node and the anchor nodes are one of: sources of the multicast group and receivers of the multicast group.

BRIEF DESCRIPTION OF THE FIGURES

FIG. 2 presents a diagram illustrating an exemplary neighbor table maintained at a router, in accordance with an embodiment of the present invention.

FIG. 3 presents a diagram illustrating an exemplary routing table maintained at a router, in accordance with an embodiment of the present invention.

FIG. 4 presents a diagram illustrating an exemplary multipoint routing table maintained at a router, in accordance with an embodiment of the present invention.

In the figures, like reference numerals refer to the same figure elements.

DETAILED DESCRIPTION

Overview

Figure 1:
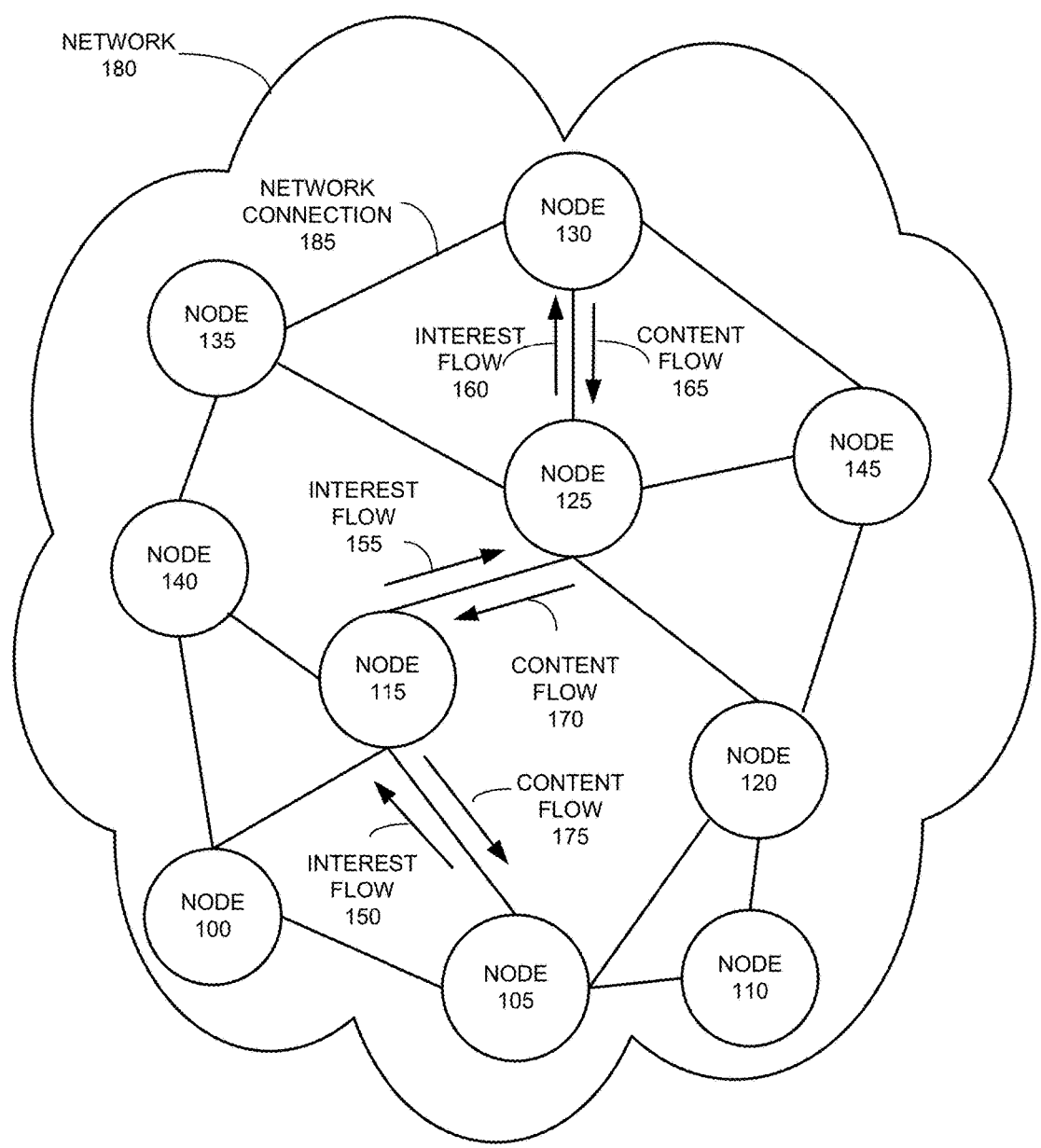
FIG. 1 illustrates an exemplary architecture of a network, in accordance with an embodiment of the present invention.

Embodiments of the present invention provide an information-centric multicasting (ICM) system for supporting multicasting groups with multiple sources in information-centric networks (ICNs). More specifically, ICM supports routing to multicast groups by establishing a multi-instantiated destination spanning tree (MIDST) for each name prefix that denotes a multicast group. All anchors of a given multicast group are connected through the MIDST for the prefix. ICM can support both source-initiated multicasting (SIM) and receiver-initiated multicasting (RIM).

Exemplary CCN Architecture

To demonstrate the operations of a link-state content routing (LCR) system, this disclosure uses CCN as an example. However, the operations of the LCR system is not limited to CCN. In general, LCR can be applied to any other type of ICN networks.

CCN uses two types of messages: Interests and Content Objects. An Interest carries the hierarchically structured variable-length identifier (HSVLI), also called the "name," of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also the HSVLI may not be human readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARIDNG A PACKET WITH A HIERARCHICHALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and optionally other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed. In this disclosure, the term "Content Object" and the term "Named Data Object (NDO)" are exchangeable.

"Face:" In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the term "face," refereeing to incoming or outgoing interface of an Interest.

"Instance:" In this disclosure, the term "instance can be used to refer to either a receiver or a source of a multicast group.

"Prefix:" In this disclosure, the term "prefix" can be used to refer to either a name of a specific multicast group or a name prefix for the multicast group.

"Anchor:" In this disclosure, the term "anchor" is used to refer to a router that advertises having an instance of a multicast group locally available. More specifically, a router (or a node) that advertises for some or all the content corresponding to a prefix is referred to as an anchor of the prefix.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message and thus reaches the requesting node.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be a content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

An Information-Centric Multicasting System

Various approaches have been proposed to support multicasting in ICNs, including a link-state routing approach that relies on each node flooding link-state advertisements (LSAs) stating the state of adjacent links and the existence of receivers for different multicast groups. Core Based Trees (CBTs) have also been introduced as an multicast routing approach that avoids the flooding from each multicast source or the flooding of information about those routers with attached multicast group receivers. In CBT, a pre-defined node serves as the intermediary of a multicast group and is called the core of the group. Nodes maintain routes to all network nodes and hence to all possible cores, and learn the mapping from the multicast group address to the address of the core by some external means. Each receiver of a multicast group sends join requests toward the core of the group to establish a shared multicast tree spanning all the receivers and the core. Sources simply send data packets toward the core, and data packets are sent to all receivers of the multicast group over the multicast tree. Another approach, Protocol Independent Multicast (PIM) is similar to CBT, but the multicast trees are unidirectional; hence, sources must send multicast data to the intermediary node, called the rendezvous point (RP), which then floods the data over the multicast tree.

Other multicast approaches include the pull-based approach and the push-based approach. The pull-based approach is adopted in Interest-based ICN architectures, such as CCN and named data networking (NDN). It has been argued that NDN and CCN provide native support for multicasting, given that Interests are aggregated along trees directed toward a site with the requested content. However, CCN and NDN can provide efficient support for single-source multicasting only, assuming that Interests state the name of the requested multicast source and that the presence of the multicast group source is advertised throughout the network. This approach does not work well for the case of multicasting with a large number of sources, because each multicast source must be known in the network and a tree to each such source needs to be maintained, which does not scale well.

The push-based multicast approach has been adopted by other ICN architectures that are not based on Interests. Content-Oriented Publish/Subscribe System (COPSS) is a good example of the PIM-based approach. In COPSS, users subscribe to content on a content descriptor (CD), which can be any legal content name, and each CD is associated with a Rendezvous Point (RP). The number of RPs may be as large as the number of ICN nodes. Routers maintain CD-based subscription tables to provide the same functionality as IP multicast, and COPSS supports sparse mode multicasting at the content layer. The RPs receive content from one or more publishers and send it over the multicast trees established by routers for the multicast groups. However, such push-based multicasting schemes can be inefficient, especially in supporting multi-source multicasting.

Embodiments of the present invention provide an information-centric multicasting system (ICM) that can support multi-source multicasting in Interest-base ICN architecture and that is more efficient than the PIM-based approaches. The operation of an ICM system assumes that: (a) each network node is assigned a name with a flat or hierarchical structure; (b) each multicast group can be requested by means of a unique name; (c) multicast group names (MGNs) can be denoted using either flat or hierarchical naming (such as HSVLI-based naming), and the same naming convention is used for the entire system; and (d) a routing protocol operates in the network to provide each router with at least one route to the nearest instance of each multicast group advertised in the network.

In order to implement ICM, routers maintain a number of data structures, including a link cost table ($LT^i$), a neighbor table ($NT^i$) or a topology table ($TT^i$), a routing table ($RT^i$), and a multipoint routing table ($MRT^i$). Note that the link cost table, the neighbor/topology table, and the routing table are provided by the content routing protocol running in the ICN, and the multipoint routing table is built by the ICM.

The link cost table for a router i ($LT^i$) lists the cost of the links from router i to each of its neighbors. In this disclosure, the link from router i to router k is denoted as (i,k) and the cost of the link is denoted as $l_k^i$. In some embodiments, the cost of the link is assumed to be a positive number, which can be a function of administrative constraints and performance measurements made by router i for the link. An entry in the link cost table for link (i,k) includes the name of neighbor k and the cost of the link ($l_k^i$).

The neighbor table ($NT^i$) stores routing information for each router in a set $N^i$, which contains router i and its neighbor routers, to prefixes. In some embodiments, information stored in $NT^i$ for a router k regarding a prefix j is denoted $NT_{jk}^i$, and consists of routing information for the nearest anchor and the root anchor of the prefix.

FIG. 2 presents a diagram illustrating an exemplary neighbor table maintained at a router, in accordance with an embodiment of the present invention. In FIG. 2, a neighbor table 200 maintained by a router i includes a number of entries indexed by the neighbor router's name and prefix. For example, entry 202 includes information for router k regarding prefix j. Entry 202 includes routing information for the nearest anchor of prefix j reported by k, which is a 3-tuple that states an anchor ($a_{jk}^i$) storing prefix j, the distance from neighbor k to prefix j ($d_{jk}^i$), and the sequence number created by $a_{jk}^i$ for prefix j ($sn_{jk}^i$). Entry 202 also includes routing information for the root anchor of prefix j, which is a 3-tuple that identifies the root anchor of prefix j ($ra_{jk}^i$), the distance from neighbor k to the root anchor of j ($rd_{jk}^i$), and the sequence number created by $ra_{jk}^i$ for prefix j ($rsn_{jk}^i$). The root anchor of a prefix is an anchor of the prefix with the smallest name, or the smallest lexicographic value. In this disclosure, |i| denotes the lexicographic value of a name i. Hence, at each router i and for any neighbor k ∈ $N^i$, $|ra_j^i| \le |ra_{jk}^i|$, and $|ra_j^i| \le |a_{jk}^i|$, where $ra_j^i$ is the root anchor for prefix j.

Note that, if prefix j is locally available at router i, then $a_{jk}^i = i$ and $d_{jk}^i = 0$. In this case, router i is its own nearest anchor for prefix j, but may not be the root anchor for prefix j. The distance from router i to the root anchor $ra_j^i$ is $rd_j^i = rd_{js}^i + l_s^i$, where s≠i is the next hop to root anchor $ra_j^i$ selected by router i. If router i is the root anchor for prefix j, then $rd_j^i = 0$.

In some embodiments, information included in the neighbor table ($NT^i$) can be derived from a topology table ($TT^i$) when the network runs a content-routing protocol based on link-state information. The topology table ($TT^i$) states the link-state information reported or forwarded by each neighbor for each router and each known prefix. In some embodiments, the information stored in $TT^i$ includes the links from i to each neighbor and to each locally available prefix, as well as the links to nodes or prefixes forwarded by neighbor routers.

The routing table ($RT^i$) maintained at router i stores routing information for each prefix known at router i. In some embodiments, a routing table may include a plurality of entries that are indexed by prefix. FIG. 3 presents a diagram illustrating an exemplary routing table maintained at a router, in accordance with an embodiment of the present invention. In FIG. 3, a routing table 300 maintained by a router i includes a plurality of entries. Each entry includes the name of a prefix, the routing update information for the prefix, a set of valid next-hop neighbors to the prefix, a neighbor that offers the shortest distance to the prefix, and an anchor list that stores a tuple for each different valid anchor reported by any next-hop neighbor. For example, entry 302 includes a prefix (j), routing update information $RUI_j^i$, a set of valid next-hop neighbors to prefix j ($S_j^i$), the shortest-path neighbor to prefix j ($s_j^i \in S_j^i$), and an anchor set $A_j^i$. Routing update information $RUI_j^i$ includes a 3-tuple that states the current distance from router i to prefix j ($d_j^i$), the anchor of prefix j that has the smallest name among those that offer the shortest distance to j($a_j^i$), and the sequence number created by $a_j^i$ for prefix j ($sn_j^i$). Anchor set $A_j^i$ stores a tuple ([m,sn(m)] ∈ $A_j^i$) for each different valid anchor reported by any next-hop neighbor, with m being the name of an anchor, and sn(m) the sequence number reported by anchor m.

The multipoint routing table ($MRT^i$) includes a plurality of entries indexed by the prefix, and is updated by exchange of messages among routers. FIG. 4 presents a diagram illustrating an exemplary multipoint routing table maintained at a router, in accordance with an embodiment of the present invention. In FIG. 4, a multipoint routing table 400 maintained by a router i includes a plurality of entries. Each entry includes the name of a prefix, the multipoint update information for the prefix, and a list of neighbors that have joined the MIDST for the prefix. For example, entry 402 includes a prefix (j), multipoint update information for prefix j ($MUI_j^i$), and a set of neighbors that have joined the MIDST for prefix j ($MIDST_j^i$). Multipoint update information $MUI_j^i$ includes a 3-tuple that states the root anchor for prefix j ($ra_j^i$), the distance to the root anchor ($rd_j^i$), and the sequence number created by $ra_j^i$ for prefix j ($rsn_j^i$).

Each router updates its multipoint routing table based on update messages received from its neighbors and signaling messages exchanged among routers to join certain MIDTSs.

In some embodiments, an update message sent from a router i to its neighbor m can include the name of router i, a message sequence number ($msn^i$) used to identify the message, and a list of updates, one for each prefix that needs updating. An update for prefix j sent by router i is denoted as $U_j^i$, and states the name of the prefix j, the distance to j ($ud_j^i$), an anchor ($ua_j^i$), and the sequence number created by anchor $ua_j^i$ for prefix j ($usn_j^i$). On the other hand, the update message received by a router i from its neighbor k for prefix j can be denoted as $U_{jk}^i$, and states the name of the prefix j, the distance to j ($ud_{jk}^i$), an anchor ($ua_{jk}^i$), and the sequence number created by anchor $ua_{jk}^i$ for prefix j ($usn_{jk}^i$).

ICM supports routing to multicast groups by means of multi-instantiated destination spanning tree (MIDST). All the anchors of a given prefix corresponding to a multicast group are connected with one another through the MIDST for the prefix, which is rooted at the root anchor of the prefix. In some embodiments, the MIDST is established using routing updates exchanged only by routers located between the root anchor and other anchors of the same group.

The MIDST for a prefix can be established in a distributed manner. More specifically, a router that knows about multiple anchors for a prefix other than the anchor it considers to be the root anchor sends updates about the root anchor along the preferred path to each of the other anchors it knows. Routers that receive updates about the root anchor send their own updates to their preferred next hops to each of the other anchors they know. This way, distance updates about the root anchor propagate to all other anchors of the same prefix. Updates about the root anchor propagate only to those routers in preferred paths between the root anchor and other anchors. If router i changes its routing information for the root anchor of prefix j, it schedules an update about its root anchor to each neighbor that satisfies a root-anchor notification condition (RNC). The RNC states that router i sends a multipoint update (which includes a 3-tuple [$ra_j^i$, $rd_j^i$, $rsn_j^i$]) to a router k ∈ $N^i - \{i\}$ only if the following two statements are true:

$$|a_{jk}^i|>|ra_j^i| \vee |ra_{jk}^i|>|ra_j^i|; \qquad \text{Statement (1)}$$

and $$\forall v \in N^i(a_{jv}^i=i) \vee \forall v \in N^i-\{k\}(a_{jk}^i \neq a_{jv}^i \vee (d_{jk}^i+l_k^i<d_{jv}^i+l_v^i \vee [d_{jk}^i+l_k^i=d_{jv}^i+l_{iv}^i \wedge |k|<|v|])). \qquad \text{Statement (2)}$$

Note that |i| denotes the lexicographic value of a name i.

Statement (1) indicates that router k has not reported as its anchor or root anchor the same root anchor viewed by router i. Statement (2) indicates that router i forwards the update about the root anchor to router k if either i is an anchor and all its neighbors report i as their chosen anchor, or k is the lexicographically smallest next hop to an anchor that is not the root anchor.

Figure 5:
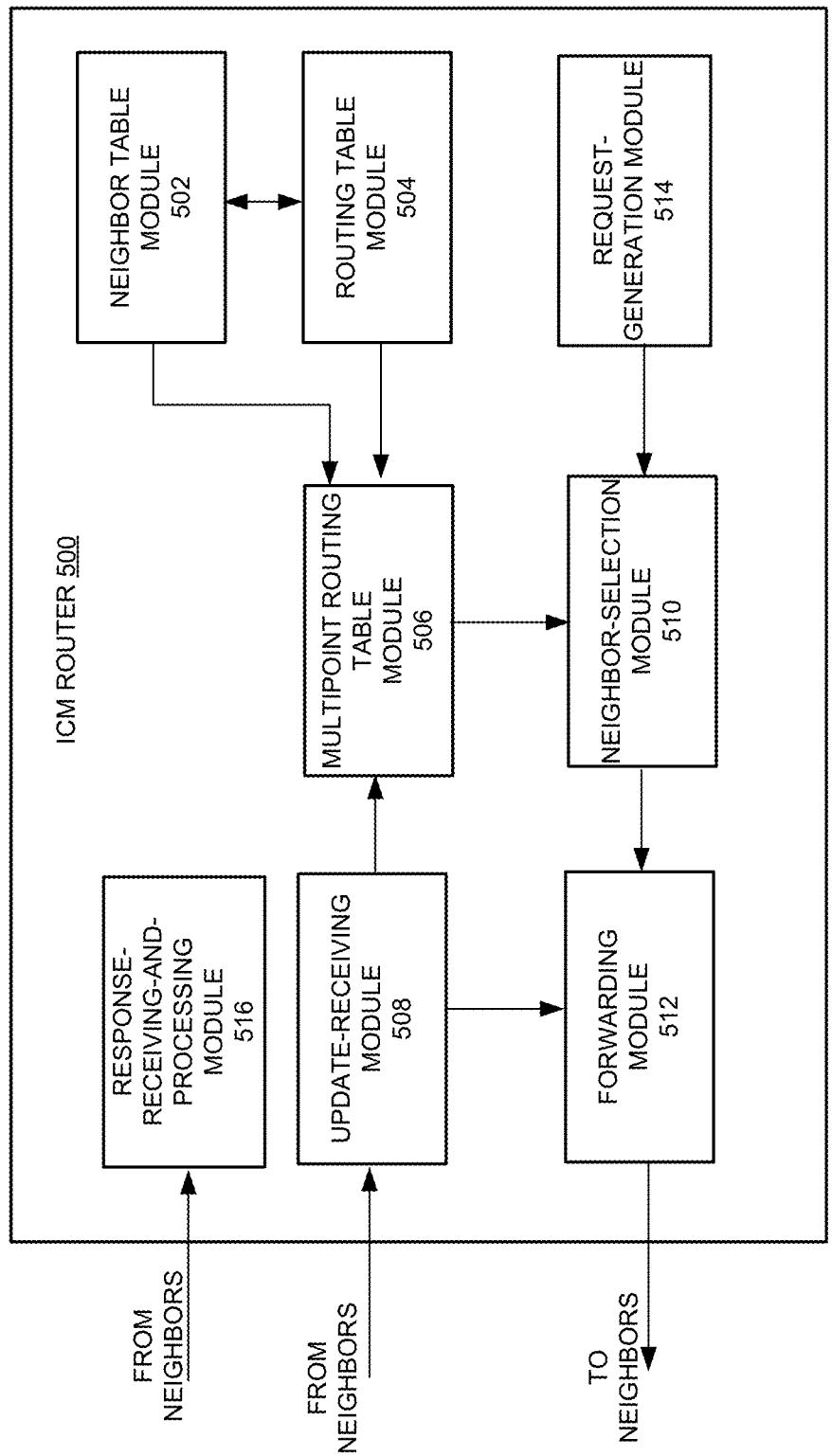
FIG. 5 presents a diagram presenting an exemplary architecture of a router that implements ICM, in accordance with an embodiment of the present invention.

FIG. 5 presents a diagram presenting an exemplary architecture of a router that implements ICM, in accordance with an embodiment of the present invention. In FIG. 5, ICM router 500 includes a neighbor table module 502, a routing table module 504, a multipoint routing table module 506, an update-receiving module 508, a neighbor-selection module 510, a forwarding module 512, a request-generation module 514, and a response-receiving-and-processing module 516.

Neighbor table module 502 is responsible for maintaining and updating the neighbor table. Routing table module 504 is responsible for maintaining and updating the routing table. As discussed previously, information included in the neighbor table and the routing table and the updating of these two tables are handled by the content routing protocol running in the network. The scope of this disclosure is not limited by the specific content routing protocol used. In some embodiments, a Distance-based Content Routing (DCR) protocol is used for content routing in the ICN.

Multipoint routing table module 506 is responsible for maintaining and updating the multipoint routing table. In some embodiments, a router updates entries in the multipoint routing table based on the update messages regarding anchors and/or the root anchor of prefixes and the "join" messages exchanged among routers.

Update-receiving module 508 is responsible for receiving root anchor updates. The received update can result in multipoint routing table module 506 updating the multipoint routing table, which includes information regarding the root anchor. Neighbor-selection module 510 is responsible for selecting neighbors for forwarding the root anchor update; and forwarding module 512 is responsible for forwarding the root anchor update. In some embodiments, forwarding module 512 is also responsible for forwarding locally originated updates regarding the root anchor. Neighbor-selection module 510 selects, based on information stored in the router (such as the link cost table, the neighbor table, and the multipoint routing table), one or more routers for forwarding the root anchor update of a particular prefix. In some embodiments, neighbor-selection module 510 selects a set of neighbors that meet the RNC condition, and forwarding module 512 forwards the root anchor update to the selected neighbors. Note that, compared with other approaches that flood the network with signaling packets for multicasting, in embodiments of the present invention, the updates are only exchanged among a subset of routers in the networks. In fact, the updates are only sent to routers that are anchors in the same multicast group or relay routers located between the root anchor and other anchors.

Request-generation module 514 is responsible for generating "join" requests. More specifically, when a router wants to join a multicast group, either as a source or receiver, request-generation module 514 generates a "join" request. In some embodiments, the "join" request includes the name of the multicast group and the name of the root anchor. Upon the generation of such a "join" request, neighbor-selection module 510 selects, among the router's next-hop neighbors to the root anchor of the prefix, a neighbor that has the smallest lexicographical value. In some embodiments, a router selects a neighbor as its next-hop neighbors to the root anchor based on whether the neighbor meets the Root-Anchor Ordering Condition (ROC). More specifically, the ROC states that a router i can select neighbor k ∈ $N^i$ as its next-hop neighbor for prefix j only if the following three statements are true:

$$|ra_{jk}^i| \leq |ra_j^i| \wedge rsn_{jk}^i \geq rsn_j^i; \qquad \text{Statement (3)}$$

$$\forall m \in N^i(rd_{jk}^i+l_k^i \leq rd_{jm}^i+l_m^i); \qquad \text{Statement (4)}$$

and $$rsn_j^i < rsn_{jk}^i \vee [rsn_j^i = rsn_{jk}^i \wedge rd_{jk}^i < rd_j^i]. \qquad \text{Statement (5)}$$

Note that statement (3) states that root anchor reported by neighbor k has the smallest name (smallest lexicographical value) among all anchors of prefix j known by router i; statement (4) states that neighbor k must offer the shortest distance to the root anchor among all neighbors; and statement (5) orders router i with its selected next hop to the root anchor based on the distance to the root anchor and the sequence number created by the root anchor. More specifically, statement (5) states that the selected next hop k must report a larger sequence number created by the root anchor than that of i, or must provide a shorter distance to the root anchor.

Upon receiving such a "join" request, a router forwards such a request to its lexicographically smallest next hop to the root anchor according to the ROC. In this way, the "join" request traverses the path toward the root anchor of the prefix, until its reaches the root anchor or a router x that is already part of the MIDST of the multicast group. In some embodiments, each router that receives and forwards a "join" request stores an entry for the request for a finite period of time. In further embodiments, the entry for the request is maintained in a data structure that is similar to a pending interest table in CCN. Such an entry indicates the neighbor from which the "join" request was received, thus enabling the response to the "join" request to traverse the reverse path of the "join" request. Response-receiving-and-processing module 516 is responsible for receiving and processing the response to the "join" request. Once such a response is processed, the router becomes part of the MIDST for the prefix. As one can see, because routers only forward the "join" request to their neighbors that meet the ROC, much fewer routers and links are used in the signaling needed to establish the MIDST of the multicast group. More specifically, other than the links that are part of the preferred paths to the root anchor, only those routers along the shortest paths between the root anchor and another anchor of the prefix may participate in the propagation of the "join" request. Such a process is more efficient than the traditional approach of building shared multicast trees or Rendezvous Point (RP) based multicast trees, in which all routers must have routes to the pre-defined root anchor.

An ICM Operation Example

Figure 6:
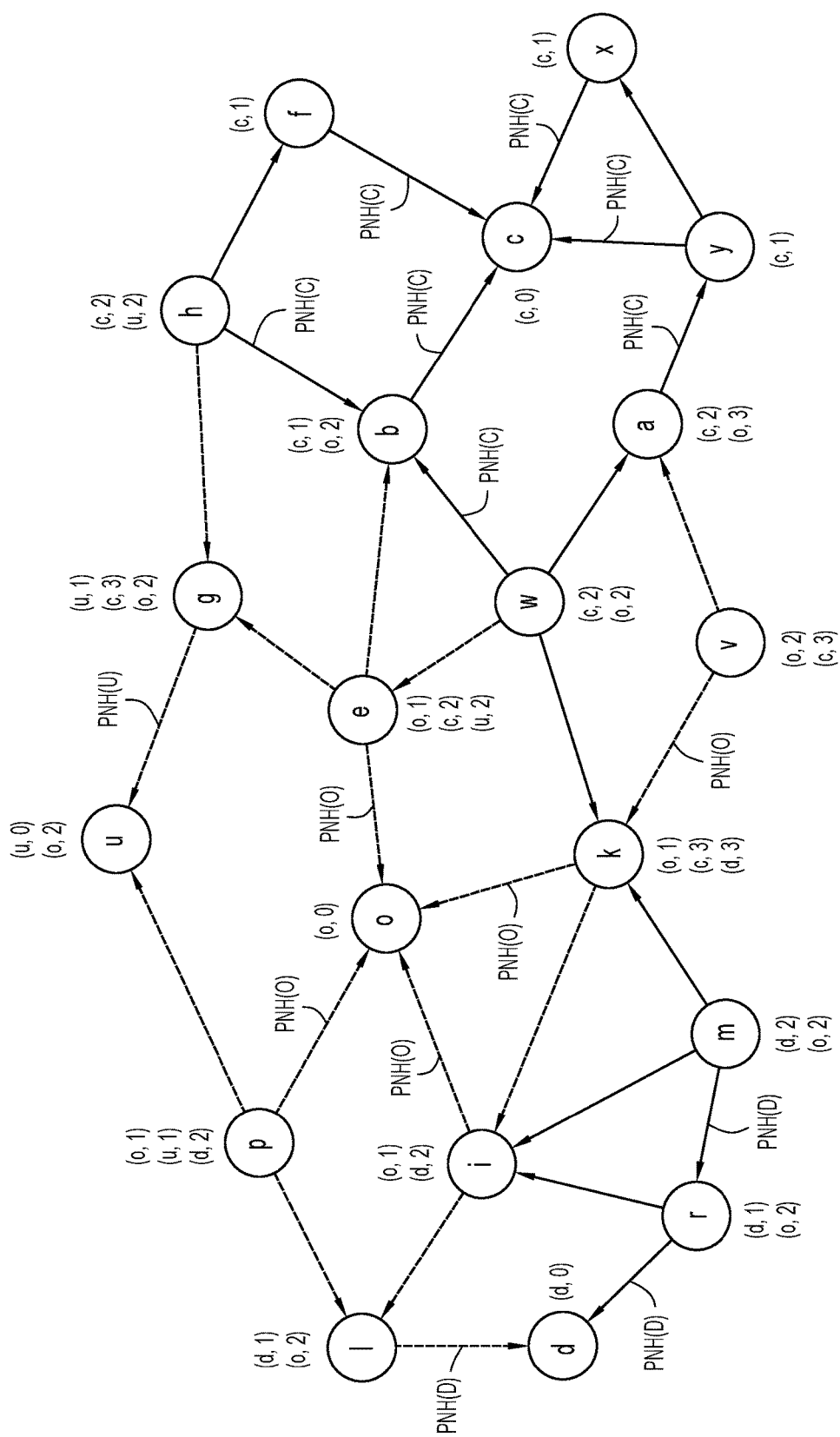
FIG. 6 illustrates the propagation of root anchor updates in an exemplary ICN, in accordance with an embodiment of the present invention.

FIG. 6 illustrates the propagation of root anchor updates in an exemplary ICN, in accordance with an embodiment of the present invention. In FIG. 6, a network 600 includes twenty routers, each identified by its name, such as routers a, c, r, . . . , x, and y. In the example shown in FIG. 6, four routers (routers c, d, u, and o, which are shaded in the figure)

serve as anchors for a particular multicast group, mg. These routers are anchors of mg because they have attached sources or attached receivers of mg, depending on the multicasting modality of mg. Among the four anchors, anchor c has the smallest lexicographic value, and is the root anchor. Note that in FIG. 6 it is assumed that each link has a unit cost.

In FIG. 6, one or more tuples are listed in lexicographic order next to each router, with each tuple stating a distance to an anchor of mg and the identifier of that anchor. The first tuple in the list states the smallest distance to mg and the anchor with the smallest name among all anchors at that same distance. For example, three tuples are listed next to router p, stating that the distance from router p to anchor o is 1 (1 hop), the distance to anchor u is 1 (1 hop), and the distance to anchor d is 2 (2 hops). In other words, the smallest distance from router p to an anchor of the prefix is 1, and such a smallest distance is to anchor o. Note that although the distances from router p to anchors o and u are both 1, anchor o is listed as the preferred anchor because it has a smaller lexicographical value than u. There are two tuples listed next to router h, stating that the distance from router h to anchor c is 2 (2 hops), and the distance to anchor u is 2 (2 hops). Similarly, because anchor c has a smaller lexicographic value than router u, even though the distance is the same, anchor c is listed in the first tuple, indicating that anchor c is the preferred anchor to router h.

In FIG. 6, the arrows indicate the direction of interfaces between two routers according to entries in their information forwarding base (FIB). For example, an arrow pointing from a router p to a router u indicates that in the FIB maintained by router p, router u is the outgoing face for Interest with the name prefix mg. On the other hand, in the FIB maintained by router u, router p is the incoming face for Interest with the name prefix mg. For clarity, FIG. 6 is labeled with reference numbers that indicate the preferred next hops to a particular anchor. That is, some of the arrows in FIG. 6 are labeled with the label PNH(θ) and an arrow with the label PNH(θ) indicates that the corresponding link is the preferred next hop (i.e., the next hop that is lexicographically smallest) for the anchor denoted by θ. For example, link (w,b) is labeled PNH (C), indicating that router b is the preferred next hop to anchor c for router w; and link (m,r) is labeled PNH(D), indicating that router r is the preferred next hop to anchor d for router m. Arrows that are unlabeled indicate the non-preferred next hops to anchors. For example, link (m,i) is unlabeled, which can indicate that router i is the next hop to anchor o, but because o has a larger lexicographic value, this link is not the preferred link.

In FIG. 6, the root anchor is router c, and dashed arrowheads and arrowheads labeled PNH(C) indicate those links over which updates about c being the root anchor of mg propagate in the direction away from c (with the updateds propagating in a direction opposite to that indicated by the arrowhead). Note that the propagations of the updates need to abide to the RNC. For example, router b propagates a root anchor update to e because that neighbor is the best choice for b toward anchor o, and router g propagates a root anchor update to u because it is the best choice for anchor u. Router o propagates an update stating that c is the root anchor of mg to all its neighbors, because it is an anchor with all its neighbors reporting o as their preferred anchor. Note that these are specified by statement (2) of RNC. As can be seen, because of RNC, updates about the root anchor of a prefix can reach all the other anchors of the prefix. However, as can be seen from FIG. 6, some routers (such as routers r and m, as they are not connected to arrows labeled PNH(C) or dashed arrows) need not participate in the propagation of the updates about root anchor c, and may not receive updates about mg with c as an anchor. This is advantageous compared with the traditional approaches where updates have to flood the entire network.

Figure 7:
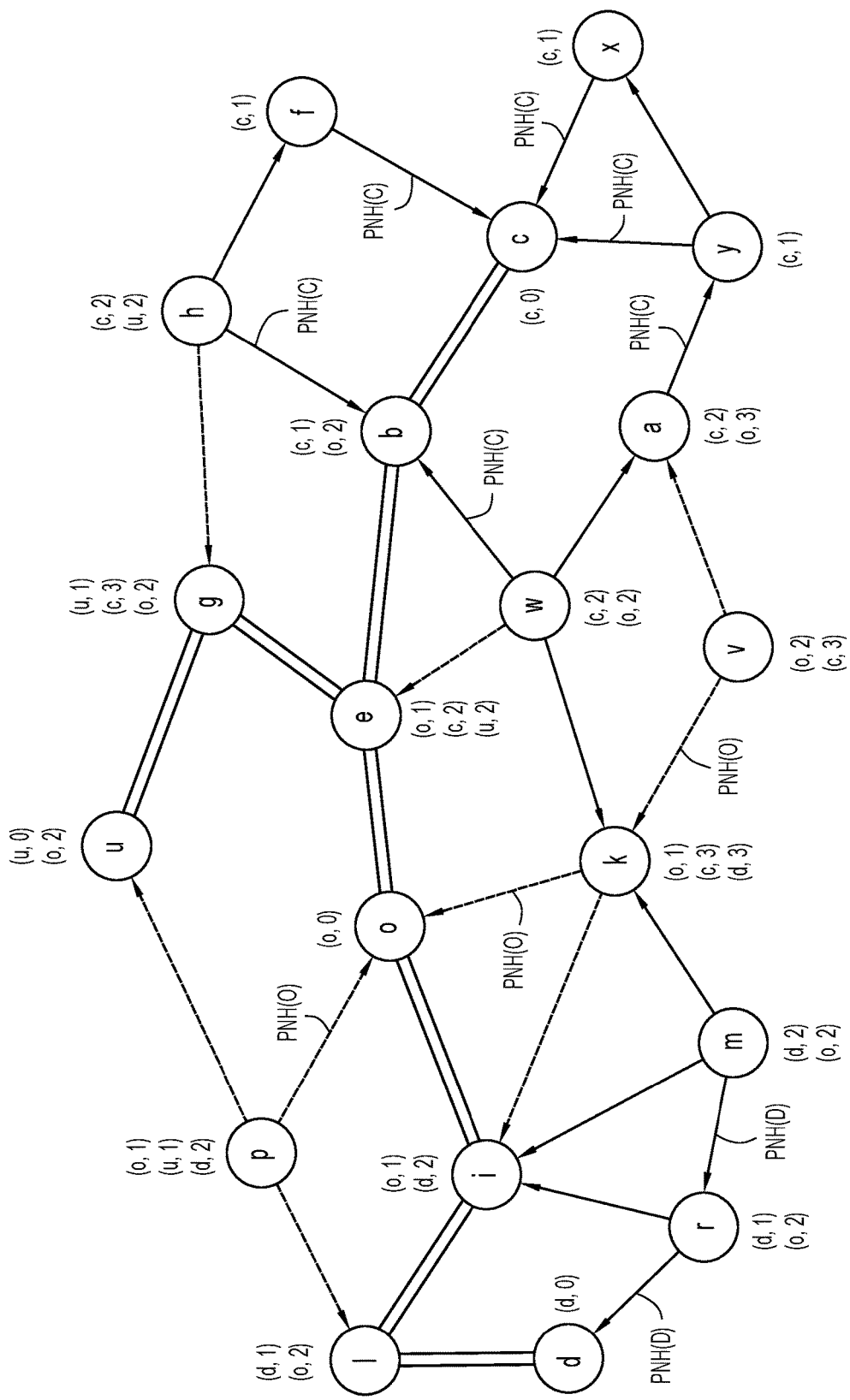
FIG. 7 illustrates the establishment of a multi-instantiated destination spanning tree (MIDST) in an exemplary ICN, in accordance with an embodiment of the present invention.

FIG. 7 illustrates the establishment of a multi-instantiated destination spanning tree (MIDST) in an exemplary ICN, in accordance with an embodiment of the present invention. The network shown in FIG. 7 is the same network 600 shown in FIG. 6, and includes twenty routers, each identified by its name, such as routers a, c, r, . . . , and y. As discussed previously, when an anchor, such as anchor u, wants to join the multicast group mg, whose root anchor is c, it needs to send a "join" request to its lexicographically smallest next hop to c. As shown in FIG. 7, router u can send the "join" request to router g, which forwards the request to root anchor c via routers e and b. Similarly, other anchors (d and o) also send their "join" request toward root anchor c in order to join the MIDST of mg. For example, router o may send a "join" request toward c, and when such a request reaches u, which is already in the MIDST, a response will be sent back to o, traversing the reverse path of the "join" request. The routers on the path become part of the MIDST. In FIG. 7, the links that constitute the MIDST for the prefix mg are indicated double line links, and multipoint data traffic for the prefix mg can flow in both directions of those links.

Depending on the multicast modality (SIM or RIM) adopted for a multicast group, the MIDST may be used differently in the implementation of ICM.

In source-initiated multicast (SIM), the sources of a multicast group advertise their presence in the network and receivers attempt to join the group of sources. The anchors of a multicast group are the sources of the group. Each source of a multicast group advertises its presence to an attached router using a Multicast Group Management Protocol (MGMP), which can be implemented using Interest-based signaling or push-based signaling, depending on the ICN architecture in which it is used. The MGMP message sent from a multicast source to its attached router states the name of the multicast group, the request to carry out SIM with the requester acting as a source of the group, and optional attributes. In some embodiments, the attributes may include a delete timer informing the router the length of time that the source is to remain active. The name of the multicast group indicates the fact that the multicast group operates in the SIM modality. Given that the sources of a multicast group make attached routers advertise the presence of the group by name, the routers attached to multicast sources are the anchors of the multicast group.

Routers use a content routing protocol, such as DCR, to provide routing to the nearest sources of the multicast group, and ICM builds and maintains the MIDST of the multicast group. The resulting MIDST connects all sources of the multicast group. To receive content from all the multicast sources of the group, a receiver sends simply an Interest to its attached router stating the name of the multicast group. In turn, the router sends an Interest toward the nearest known anchor of the multicast group. Content from the multicast group is delivered over the reverse path traversed by the Interest. A router attached to a source of the multicast group forwards content to each neighbor that submitted an Interest for the group, as well as each neighbor that is a member of the MIDST created for the multicast group. As a result, receivers are able to obtain content from all sources of a multicast group for which they stated an Interest. The SIM modality of ICM can be used to implement a simple extension of the single-source multicast support available in NDN and CCN. Instead of each receiver having to send Interests for each multicast source, a receiver simply sends Interests requesting content from all the sources of the multicast group, which is denoted by name in such Interests. Note that requiring receivers to submit Interest for multicast content is not as efficient as a push-based approach. ICM could be used more efficiently in CCN and NDN by defining long-term Interests that elicit multiple data objects.

In receiver-initiated multicast (RIM), the receivers of a multicast group advertise their presence in the network and the source sends content toward the nearest receivers of the group. The anchors of a multicast group in RIM are the receivers of the group. Each receiver of a multicast group advertises its presence to an attached router using a Multicast Group Management Protocol (MGMP). The MGMP message sent from a multicast receiver to its attached router states the name of the multicast group, the request to carry out the RIM modality with the requester acting as a receiver of the group, and optional attributes. In some embodiments, the attributes may include a delete timer informing the router the length of time that the source is to remain active. The name of the multicast group indicates the fact that the multicast group operates using the RIM modality. The routers attached to multicast receivers are the anchors of the multicast group. Routers use a content routing protocol, such as DCR, to provide routing to the nearest sources of the multicast group, and ICM builds and maintains the MIDST of the multicast group using the nearest-instance routing information provided by the routing protocol. The resulting MIDST connects all receivers of the multicast group. To send content to the multicast receivers of the group, a source simply sends the content to its attached router, who in turn sends the content to the nearest anchor of the group based on the nearest-instance routing information. The first anchor of the group or router in the MIDST of the multicast group that receives the content broadcasts it over the MIDST. As a result, all receivers of the multicast group obtain the content from any one source.

Computer and Communication System

Figure 8:
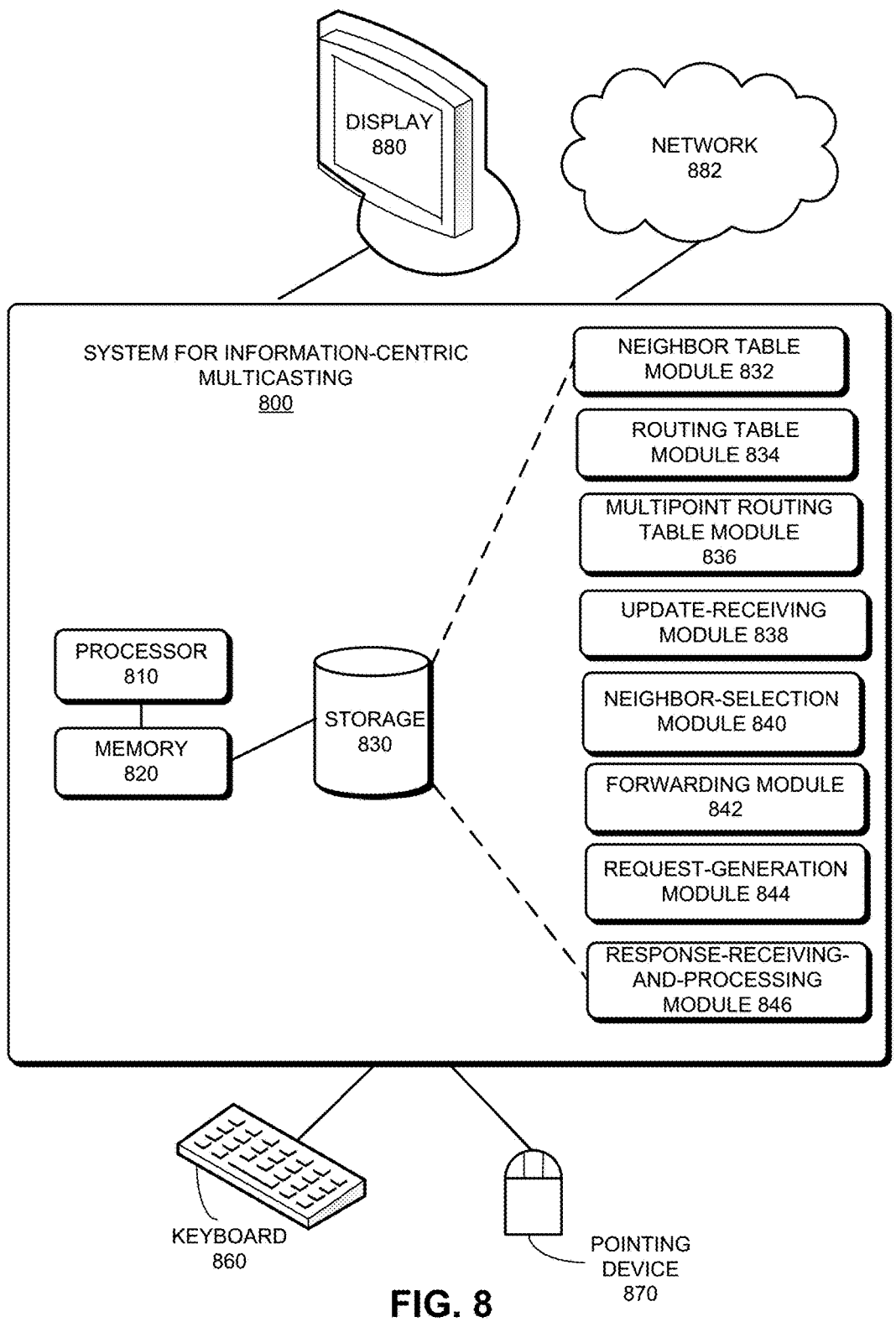
FIG. 8 illustrates an exemplary system for information-centric multicasting, in accordance with an embodiment of the present invention.

FIG. 8 illustrates an exemplary system for information-centric multicasting, in accordance with an embodiment of the present invention. A system 800 for information-centric multicasting comprises a processor 810, a memory 820, and a storage 830. Storage 830 typically stores instructions that can be loaded into memory 820 and executed by processor 810 to perform the methods mentioned above. In one embodiment, the instructions in storage 830 can implement a neighbor table module 832, a routing table module 834, a multipoint routing table module 836, an update-receiving module 838, a neighbor-selection module 840, a forwarding module 842, a request-generation module 844, and a response-receiving-and-processing module 846, all of which can be in communication with each other through various means.

In some embodiments, modules 832-846 can be partially or entirely implemented in hardware and can be part of processor 810. Further, in some embodiments, the system may not include a separate processor and memory. Instead, in addition to performing their specific tasks, modules 832-846, either separately or in concert, may be part of general- or special-purpose computation engines.

Storage 830 stores programs to be executed by processor 810. Specifically, storage 830 stores a program that implements a system (application) for information-centric multicasting. During operation, the application program can be loaded from storage 830 into memory 820 and executed by processor 810. As a result, system 800 can perform the functions described above. System 800 can be coupled to an optional display 880 (which can be a touch screen display), keyboard 860, and pointing device 870, and can also be coupled via one or more network interfaces to network 882.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for updating routing information associated with a multicast group in an information-centric network (ICN), the method comprising:
receiving, by a first node in the ICN, an update message from a neighbor node that specifies a prefix associated with the multicast group and specifies a particular node as a root anchor node of the multicast group, wherein the multicast group includes a plurality of anchor nodes and the root anchor node has a name with a lexicographical value that is smaller than lexicographical values of names of other anchor nodes of the plurality of anchor nodes;
determining one or more next-hop neighbors of the first node that: (a) are reporting nodes different from the particular node as the root anchor node; and (b) provide a shortest path to one of the other anchor nodes; and
forwarding the update message to the one or more next-hop neighbors.

2. The method of claim 1, wherein the one or more next-hop neighbors report the first node as a preferred anchor node.

3. The method of claim 1, wherein the determining further comprises:

determining the one or more next-hop neighbors provide the shortest-path and a lexicographically smallest path to the one of the other anchor nodes.

4. The method of claim 1, further comprising:
receiving a join request from a second node, wherein the first node is a next-hop neighbor of the second node to the root anchor node, and the first node provides a shortest path from the second node to the root anchor node.

5. The method of claim 4, further comprising:
storing an entry for the join request in a data structure that indicates the second node; and
receiving a response to the join request from the root anchor node or an anchor node of the multicast group.

6. The method of claim 4, wherein the first node reports the root anchor node to the second node.

7. The method of claim 1, wherein the first node advertises for content corresponding to the prefix.

8. A non-transitory, computer-readable storage medium storing instructions that, when executed by a computing device, cause the computing device to perform a method for updating routing information associated with a multicast group in an information-centric network (ICN), the method comprising:
receiving, by a first node in the ICN, an update message from a neighbor node that specifies a prefix associated with the multicast group and specifies a particular node as a root anchor node of the multicast group, wherein the multicast group includes a plurality of anchor nodes and the root anchor node has a name with a lexicographical value that is smaller than lexicographical values of names of other anchor nodes of the plurality of anchor nodes;
determining one or more next-hop neighbors of the first node that: (a) are reporting nodes different from the particular node as the root anchor node; and (b) provide a shortest path to one of the other anchor nodes; and
forwarding the update message to the one or more next-hop neighbors.

9. The computer-readable storage medium of claim 8, wherein the one or more next-hop neighbors report the first node as a preferred anchor node.

10. The computer-readable storage medium of claim 8, wherein the determining further comprises:
determining the one or more next-hop neighbors provide the shortest-path and a lexicographically smallest path to the one of the other anchor nodes.

11. The computer-readable storage medium of claim 8, the method further comprising:
receiving a join request from a second node, wherein the first node is a next-hop neighbor of the second node to the root anchor node, and the first node provides a shortest path from the second node to the root anchor node.

12. The computer-readable storage medium of claim 11, the method further comprising:
storing an entry for the join request in a data structure that indicates the second node; and
receiving a response to the join request from the root anchor node or an anchor node of the multicast group.

13. The computer-readable storage medium of claim 11, wherein the first node reports the root anchor node to the second node.

14. The computer-readable storage medium of claim 8, wherein the first node advertises for content corresponding to the prefix.

15. A computer system for updating routing information associated with a multicast group in an information-centric network (ICN), the system comprising:
a processor configured to:
receive an update message for the multicast group from a neighbor node that specifies a prefix associated with the multicast group and specifies a particular node as a root anchor node of the multicast group, wherein the multicast group includes a plurality of anchor nodes and the root anchor node has a name with a lexicographical value that is smaller than lexicographical values of names of other anchor nodes of the plurality of anchor nodes;
determine one or more next-hop neighbors of the system that : (a) are reporting nodes different from the particular node as the root anchor node and (b) provide a shortest path to one of the other anchor nodes; and
forward the update message to the one or more next-hop neighbors.

16. The system of claim 15, wherein the one or more next-hop neighbors report the system as a preferred anchor node.

17. The system of claim 15, wherein in determining, the processor is further configured to:
determine the one or more next-hop neighbors provide the shortest path and a lexicographically smallest path to the one of the other anchor nodes.

18. The system of claim 15, wherein the processor is further configured to receive a join request from a second node, wherein the system is a next-hop neighbor of the second node to the root anchor node, and the system provides a shortest path from the second node to the root anchor node.

19. The system of claim 18, wherein the processor is further configured to store an entry for the join request in a data structure that indicates the second node and to receive a response to the join request from the root anchor node or an anchor node of the multicast group.

20. The system of claim 18, wherein the processor is further configured to report the root anchor node to the second node.

* * * * *